(12) United States Patent
Yu et al.

(10) Patent No.: US 10,256,907 B2
(45) Date of Patent: Apr. 9, 2019

(54) SYSTEM AND METHOD FOR COHERENT DETECTION WITH DIGITAL SIGNAL PROCESSION

(71) Applicant: ZTE (USA) Inc., Austin, TX (US)

(72) Inventors: Jianjun Yu, Basking Ridge, NJ (US); Jianqiang Li, Morristown, NJ (US); Hung-Chang Chien, Rockaway, NJ (US); Zhensheng Jia, Morganville, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 15/850,782

(22) Filed: Dec. 21, 2017

(65) Prior Publication Data

US 2018/0294880 A1    Oct. 11, 2018

Related U.S. Application Data

(63) Continuation of application No. 15/296,200, filed on Oct. 18, 2016, which is a continuation-in-part of application No. 14/377,685, filed as application No. PCT/US2013/025265 on Feb. 8, 2013, now Pat. No. 9,825,707.

(60) Provisional application No. 61/597,487, filed on Feb. 10, 2012.

(51) Int. Cl.
| | |
|---|---|
| *H04B 10/2513* | (2013.01) |
| *H04L 27/26* | (2006.01) |
| *H04B 10/61* | (2013.01) |
| *H04J 14/02* | (2006.01) |
| *H04B 10/516* | (2013.01) |
| *H04B 10/50* | (2013.01) |
| *H04J 14/06* | (2006.01) |

(52) U.S. Cl.
CPC ....... *H04B 10/2513* (2013.01); *H04B 10/503* (2013.01); *H04B 10/5161* (2013.01); *H04B 10/614* (2013.01); *H04B 10/6161* (2013.01); *H04J 14/02* (2013.01); *H04J 14/06* (2013.01); *H04L 27/2637* (2013.01); *H04L 27/2697* (2013.01)

(58) Field of Classification Search
CPC .. H04B 10/2507; H04B 10/50; H04B 10/548; H04B 10/2513; H04B 10/614; H04B 10/6161; H04B 10/5161; H04B 10/503; H04L 27/2601; H04L 27/2697; H04L 27/2096; H04L 27/2627; H04L 25/03178; H04L 2025/03414; H04L 27/2637; H04J 14/0298; H04J 14/06; H04J 14/02
See application file for complete search history.

(56) References Cited

U.S. PATENT DOCUMENTS

| | | | | |
|---|---|---|---|---|
| 7,970,290 | B2 * | 6/2011 | Tao | H04B 10/61 398/202 |
| 9,825,707 | B2 * | 11/2017 | Yu | H04B 10/548 |
| 2005/0271387 | A1 * | 12/2005 | Kee | H04B 10/2543 398/140 |
| 2009/0190929 | A1 * | 7/2009 | Khurgin | H04B 10/61 398/79 |
| 2010/0021166 | A1 * | 1/2010 | Way | H04J 14/02 398/79 |

(Continued)

*Primary Examiner* — Leslie C Pascal
(74) *Attorney, Agent, or Firm* — Drinker Biddle & Reath LLP

(57) ABSTRACT

Methods and apparatus to realize high spectral efficiency in optical signals transmitted over long distances.

7 Claims, 2 Drawing Sheets

(56) References Cited

U.S. PATENT DOCUMENTS

| | | | | |
|---|---|---|---|---|
| 2010/0135656 A1* | 6/2010 | Khurgin | ............... | H04B 10/61 398/43 |
| 2010/0310256 A1* | 12/2010 | Shpantzer | ............. | H04B 10/61 398/74 |
| 2011/0069975 A1* | 3/2011 | Liu | ...................... | H04B 10/61 398/202 |
| 2012/0087668 A1* | 4/2012 | Li | ...................... | H04L 27/2628 398/79 |

* cited by examiner

200: I/Q imbalance compensation
201: electrical CD compensation
202: Resampling
203: Adaptive equalilzers
204: frequency offset compensation
205: carrier phase compensation
206: Filter
207: 2-state MLSE
208: BER

SYSTEM AND METHOD FOR COHERENT DETECTION WITH DIGITAL SIGNAL PROCESSION

CROSS-REFERENCE TO RELATED APPLICATIONS

This application is a continuation of U.S. patent application Ser. No. 15/296,200, filed on Oct. 18, 2016, which is a continuation-in-part of U.S. patent application Ser. No. 14/377,685, filed on Aug. 8, 2014, which is a national stage application (under 35 U.S.C. § 371) of PCT/US2013/25265, filed Feb. 8, 2013, which claims benefit of U.S. Application No. 61/597,487, filed Feb. 10, 2012, both of which are incorporated herein by reference in their entirety.

FIELD OF THE INVENTION

The present invention relates to communication systems, and particularly, coherent detection with digital signal processing.

BACKGROUND

Increasing bandwidth demand has been driving communication systems to higher capacities. Therefore, there is a strong motivation to enhance spectral efficiency to increase the total capacity. Employing optical orthogonal frequency division multiplexing (O-OFDM) modulation to transmit signals can realize high-spectral efficiency and long distance transmission. To achieve high receiver sensitivity with coherent detection based on digital signal processing, the bandwidth of the analog to digital converter (ADC) and the sample rate may be high. Usually, the ADC bandwidth may have two times of the bit rate of the signal, and the sampling rate may be four times of the bit rate. For example, if each subcarrier of the OFDM signal is 25 Gbaud Quadrature Phase Shift Keyed (QPSK), the ADC bandwidth should be 50 GHz and the sample rate should be 100 GSa/s to obtain optimum results. However, an ADC with these specifications may not be commercially available. Therefore it would be advantageous to reduce the ADC bandwidth and sample rate while maintaining the same performance.

SUMMARY OF THE INVENTION

Aspects of the present invention employ optical orthogonal frequency division multiplexing (O-OFDM) to transmit signals realizing high spectral efficiency over long distances.

Aspects of the present invention include apparatus and methods for transmitting and receiving signals in a communication system. A multicarrier generator generates a multicarrier signal. An optical demultiplexer separates the multicarrier signal into separate subcarrier signals. Phase and QPSK modulators modulate signals from the separate subcarrier signals. An optical multiplexer combines the modulated subcarrier signals into a multiplexed signal. The multiplexed signal is then transmitted.

DETAILED DESCRIPTION OF EMBODIMENTS

Aspects of the present invention employ optical orthogonal frequency division multiplexing (O-OFDM) to transmit signals realizing high-spectral efficiency over long distances.

Figure 1:
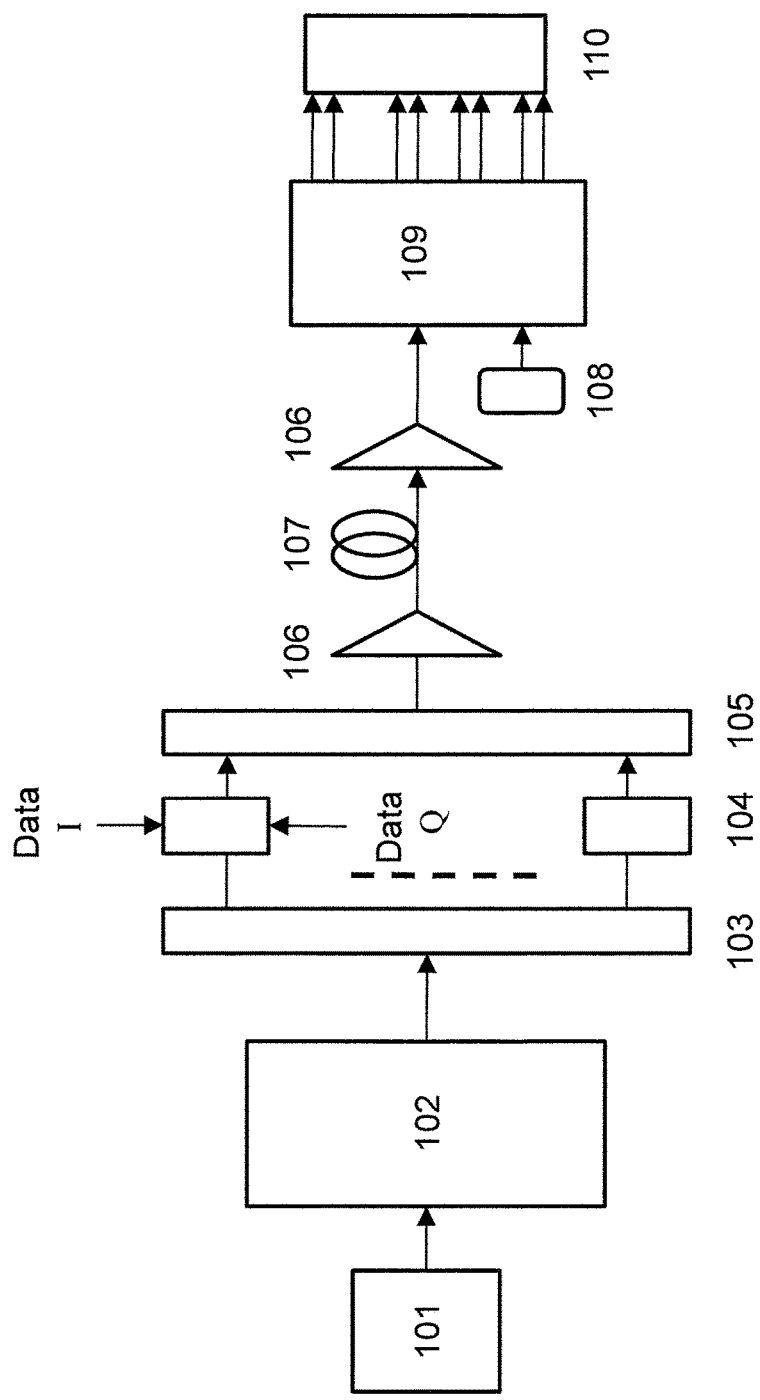
FIG. 1 illustrates a schematic diagram of a transmitter and receiver according to aspects of the present invention.

FIG. 1 illustrates a schematic diagram of a transmitter and receiver according to aspects of the present invention. A laser 101 generates a continuous lightwave. The laser 101 may be a distributed feedback type laser diode (DFB-LD), which may have a wide line width. For a 100 Gbit/s QPSK for example, a line width smaller than 2 MHz may be used, although in embodiments line widths greater than 2 MHz may also be sufficient. Alternatively, the laser source 101 may be a tunable external laser with a narrow line width and low phase noise which may be preferred for high level modulation format signals. A multicarrier generator 102 receives the lightwave and generates a multicarrier signal. This multicarrier signal may be generated by a few different schemes, such as cascaded phase and intensity modulators driven by a sinusoidal wave source, or cascaded phase modulators. In an embodiment, ten subcarriers with fixed frequency spacing of f may be generated, although another number of subcarriers may be generated.

To separate the optical subcarriers for routing to respective ports, an optical demultiplexer may be employed 103. This optical demultiplexer 103 may be an array waveguide grating, an optical fiber Bragg grating, or other optical demultiplexer as known in the art. Each subcarrier from the respective output ports of the optical demultiplexer 103 may be modulated by using an optical I/Q modulator 104. In particular, the optical I/Q modulator 104 generates QPSK signals. These QPSK signals may have a non-return-to-zero or return-to-zero pulse shape. This signal may be a polarization multiplexed signal. The optical I/Q modulator 104 may be driven by four individual data signals, that is, In Phase (I) and Quadrature Phase (Q) for X polarization, and I and Q for Y polarization. The baud rate of the I or Q signals may preferably be f Gbaud/s.

An optical multiplexer 105 with a 3 dB bandwidth of f GHz may be used to combine the modulated signals from the optical I/Q modulator 104 as subchannels. The optical multiplexer 105 may be a regular WDM filter, a WDM coupler, an array waveguide grating (AWG), or other optical filter to combine all of the subchannels. An optical amplifier 106 may be used to compensate for subsequent transmission fiber loss. This optical amplifier 106 may be an Erbium doped fiber amplifier, Raman amplifier, or other amplifier to provide gain as is known in the art. The multiplexed signal may then be transmitted over a fiber 107. The fiber 107 may be any transmission fiber. In embodiments, optical amplifier 106 may alternatively or additionally be placed at the receiving side of transmission fiber 107.

The transmitter disclosed in the foregoing is different from conventional optical OFDM signal generation at least in that, in contrast to the prior art, there is no time synchronization between the transmitter and the receiver. Moreover, optical couplers are not used to combine the subchannels as in the prior art. Instead, the disclosed transmitter uses an optical multiplexer such as arrayed waveguide grating to combine subchannels.

On the receiver side, coherent detection based on digital signal processing is used. The coherent detection technique employs the use of an optical local oscillator 108, a 90 degree hybrid 109, four balanced receivers, ADC chips and ASIC chips for digital signal processing. The frequency of the optical local oscillator 108 is preferably the same as the frequency of one of the subcarriers. The local oscillator 108 may be a distributed feedback laser (DFB) or an external cavity laser with a line width preferably smaller than a few MHz. The 90 degree hybrid 109 may be a regular optical 90 degree hybrid to demultiplex the I and Q signal. Digital coherent detection block 110 includes balanced or unbalanced photodiodes, high speed ADC and other electrical components such as ASIC, FEC, and the like.

The receiver is different from prior art arrangements at least in that it does not require wideband ADC chips with high sampling rate to detect the received signal. Instead, commonly available ADC chips with low bandwidth may be used. In an exemplary embodiment, for subchannel spacing f GHz, an ADC bandwidth of about 0.5 f GHz is sufficient, and a sampling rate of about 1.5 f GSa/s or more is sufficient. Moreover, an additional DSP with one post filter and MLSE are employed for data detection.

Figure 2:
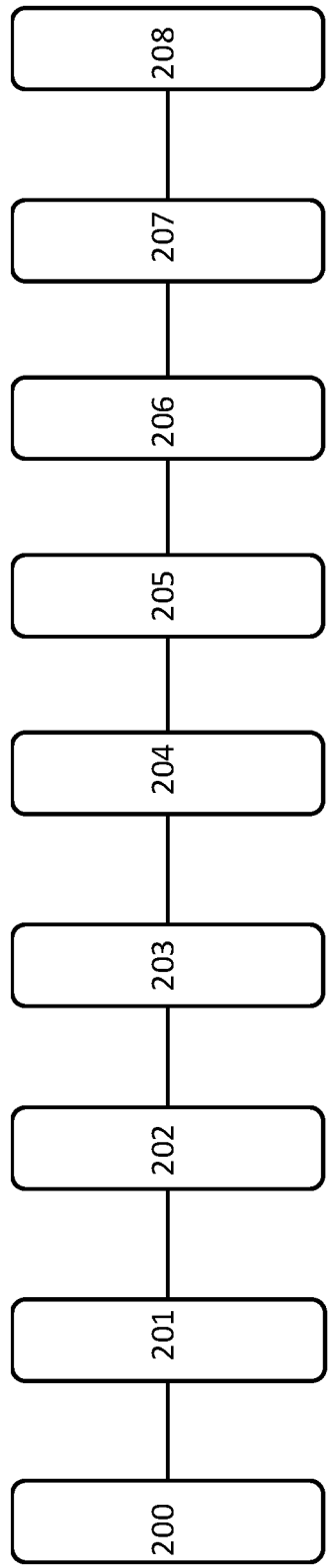
FIG. 2 illustrates a schematic diagram of digital signal processing for a coherent receiver according to aspects of the present invention.

FIG. 2 illustrates a schematic of digital signal processing (DSP) for a coherent receiver with post filter and maximum likelihood sequence estimation (MLSE). A compensation module 200 may correct an I/Q imbalance of the received signal. A dispersion compensating unit 201 may compensate for chromatic dispersion. Sampling unit 202 samples and resamples the signal, and each bit is sampled twice. Through the use of adaptive equalizers 203, a polarization demultiplexer is realized that generates polarization demultiplexed signals. An offset module 204 compensates for a frequency offset of the demultiplexed signals in order to improve the quality of communication. Phase module 205 phase compensates the demultiplexed signal. A filter 206 post filters the phase compensated signal. The filter 206 may be a 2 tap filter. MLSE, which may be two state, is applied to the filtered signals to recover data in the signals in data estimator 207. A bit error rate may be calculated in BER calculator 208.

The foregoing discloses and describes novel methods and systems for coherent detection with digital signal processing. In the transmitter, there are several subchannels. Each subchannel has a channel spacing of f GHz; each subchannel carries f Gbaud QPSK signal. After optical multiplexing and signal transmission in optical fiber, coherent detection is employed in the receiver, with DSP to detect the signal. This DSP includes commonly available DSP hardware, with additional post filter and MLSE processing.

It should be understood that the methods and devices of the present invention may be executed employing machines and apparatus including simple and complex computers. Moreover, the architecture and methods described above can be stored, in part or in full, on tangible machine readable media. For example, the operations of the present invention could be stored on media such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASICs), firmware such as electrically erasable programmable read-only only memory (EEPROMs); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts herein. The invention, therefore, is not to be restricted except in the spirit of the following claims.

What is claimed is:

1. A method of generating a wide bandwidth multiplexed optical signal and transmitting it over an optical fiber, the method comprising:
   generating, by a laser, a continuous lightwave;
   generating, from the continuous lightwave, a multicarrier signal having a fixed channel spacing of f GHz;
   separating the multicarrier signal into a plurality of optical subcarriers;
   routing each of the optical subcarriers to a respective I/Q modulator and modulating each of the subcarriers to carry f Gbaud of data as a QPSK signal by the corresponding I/Q modulator;
   combining, in an optical multiplexer, the modulated optical subcarriers into a multiplexed optical signal, wherein the optical multiplexer has a 3 dB bandwidth of –f GHz; and
   transmitting the multiplexed optical signal with no synchronization information over an optical fiber.

2. The method of claim 1, wherein the continuous lightwave has a line width of about 2 MHz.

3. The method of claim 1, wherein the laser is a tunable external laser with a line width narrower than 2 MHz and low phase noise.

4. The method of claim 1, wherein at least ten subcarriers are generated.

5. The method of claim 1, wherein the I signals and Q signals are each modulated to carry f Gbaud/s.

6. The method of claim 1, wherein the multiplexer is one of a regular WDM filter, a WDM coupler, and an array waveguide grating.

7. The method of claim 1, further comprising amplifying the multiplexed signal before it is transmitted to compensate for transmission loss in the optical fiber.

* * * * *